(12) United States Patent
Song et al.

(10) Patent No.: US 9,831,515 B2
(45) Date of Patent: Nov. 28, 2017

(54) SYSTEM AND METHOD FOR RECOVERING OUTPUT OF FUEL CELL

(71) Applicant: Hyundai Motor Company, Seoul (KR)

(72) Inventors: Yo In Song, Gyeonggi-do (KR); Sung Mun Cho, Gyeonggi-do (KR); Jae Young Jang, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 412 days.

(21) Appl. No.: 14/489,887

(22) Filed: Sep. 18, 2014

(65) Prior Publication Data

US 2015/0270565 A1 Sep. 24, 2015

(30) Foreign Application Priority Data

Mar. 24, 2014 (KR) ........................ 10-2014-0034031

(51) Int. Cl.
*H01M 8/04992* (2016.01)
*B60L 11/18* (2006.01)
(Continued)

(52) U.S. Cl.
CPC ......... *H01M 8/04992* (2013.01); *B60L 1/003* (2013.01); *B60L 3/0053* (2013.01); *B60L 11/1803* (2013.01); *B60L 11/1885* (2013.01); *B60L 11/1887* (2013.01); *B60L 11/1892* (2013.01); *B60L 11/1894* (2013.01); *B60L 15/20* (2013.01); *H01M 8/04037* (2013.01); *H01M 8/0491* (2013.01); *H01M 8/04223* (2013.01); *H01M 8/04238* (2013.01); *H01M 8/04358* (2013.01); *H01M 8/04701* (2013.01); *H01M 8/04723* (2013.01); *H01M 8/04753* (2013.01); *H01M 8/04828* (2013.01);
(Continued)

(58) Field of Classification Search
CPC combination set(s) only.
See application file for complete search history.

(56) References Cited

U.S. PATENT DOCUMENTS 5,601,936 A * 2/1997 Dudfield ........... H01M 8/04223
429/432
6,793,027 B1 * 9/2004 Yamada ................... B60K 1/04
180/65.1
(Continued)

FOREIGN PATENT DOCUMENTS

JP 2000-077085 A 3/2000
JP 2006-216367 A 8/2006
(Continued)

*Primary Examiner* — Ula C Ruddock
*Assistant Examiner* — Amanda Barrow
(74) *Attorney, Agent, or Firm* — Mintz Levin Cohn Ferris Glovsky and Popeo, P.C.; Peter F. Corless

(57) ABSTRACT

A system and method for recovering an output of a fuel cell is provided. The system and method for recovering an output of a fuel cell includes: an output recovering device connected to a fuel cell stack through at least one coolant heater line; and a vehicle controller configured to communicate with the output recovering device and control supply of a coolant, air, and hydrogen to the fuel cell stack. The output recovering device also includes a current supplier configured to supply a current to the fuel cell stack and a controller configured to communicate with the vehicle controller and control the current supplied from the current supplier.

11 Claims, 5 Drawing Sheets

(51) Int. Cl.
    *H01M 8/04223*    (2016.01)
    *H01M 8/04828*    (2016.01)
    *H01M 8/04858*    (2016.01)
    *H01M 8/04007*    (2016.01)
    *H01M 8/0432*     (2016.01)
    *H01M 8/04701*    (2016.01)
    *H01M 8/04746*    (2016.01)
    *B60L 1/00*       (2006.01)
    *B60L 3/00*       (2006.01)
    *B60L 15/20*      (2006.01)

(52) U.S. Cl.
    CPC ..... *H01M 8/04917* (2013.01); *B60L 2210/12* (2013.01); *B60L 2210/14* (2013.01); *B60L 2240/36* (2013.01); *B60L 2240/423* (2013.01); *B60L 2240/662* (2013.01); *B60L 2240/80* (2013.01); *B60L 2250/12* (2013.01); *H01M 2250/20* (2013.01); *Y02T 10/645* (2013.01); *Y02T 10/7225* (2013.01); *Y02T 10/7233* (2013.01); *Y02T 10/7275* (2013.01); *Y02T 10/7291* (2013.01); *Y02T 90/16* (2013.01); *Y02T 90/32* (2013.01); *Y02T 90/34* (2013.01)

(56) References Cited

U.S. PATENT DOCUMENTS

| | | | |
|---|---|---|---|
| 7,166,985 B1* | 1/2007 | Arikara | H01M 8/04089 320/101 |
| 2002/0018922 A1* | 2/2002 | Fuglevand | H01M 8/04007 429/429 |
| 2003/0186093 A1* | 10/2003 | St-Pierre | H01M 8/04156 429/413 |
| 2004/0229097 A1* | 11/2004 | Hirakata | H01M 8/04253 429/442 |
| 2005/0123809 A1* | 6/2005 | Saunders | H01M 8/04238 429/412 |
| 2005/0189156 A1* | 9/2005 | Osborne | B60L 11/1885 429/413 |
| 2006/0152085 A1* | 7/2006 | Flett | B60L 9/30 307/75 |
| 2006/0172159 A1* | 8/2006 | Kumar | H01M 8/04089 429/429 |
| 2006/0249399 A1* | 11/2006 | Uribe | H01M 8/04223 205/705 |
| 2007/0054160 A1* | 3/2007 | Ovshinsky | H01M 4/8615 429/422 |
| 2008/0206608 A1* | 8/2008 | Lienkamp | H01M 8/04126 429/444 |
| 2010/0167149 A1* | 7/2010 | Ishikawa | H01M 8/04029 429/434 |
| 2011/0159393 A1* | 6/2011 | Takemoto | B60L 11/1883 429/436 |
| 2011/0214930 A1* | 9/2011 | Betts | B60L 11/18 180/65.1 |
| 2013/0323539 A1* | 12/2013 | Furusawa | H01M 8/04007 429/9 |
| 2014/0120436 A1* | 5/2014 | Blanchet | B01B 1/005 429/414 |

FOREIGN PATENT DOCUMENTS

| | | | | |
|---|---|---|---|---|
| JP | 2008152936 A | | 7/2008 | |
| JP | 2009-070691 | * | 4/2009 | ............. H01M 8/04 |
| JP | 2009-070691 A | | 4/2009 | |
| KR | 10-2007-0084733 A | | 8/2007 | |
| KR | 10-0901156 | | 6/2009 | |
| KR | 10-1063614 | | 9/2011 | |
| KR | 10-2013-0122434 | | 11/2013 | |

\* cited by examiner

[FIG. 3]
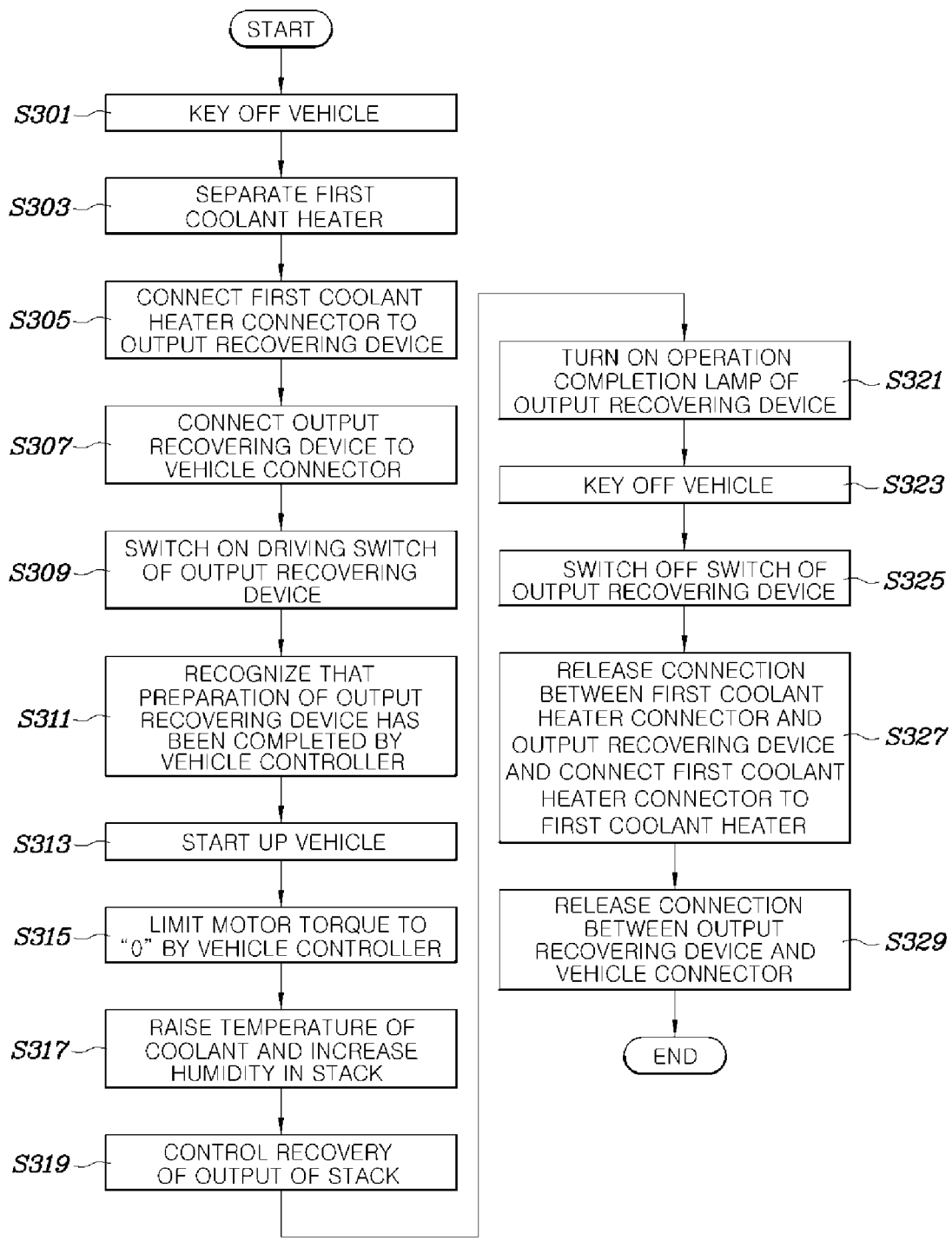

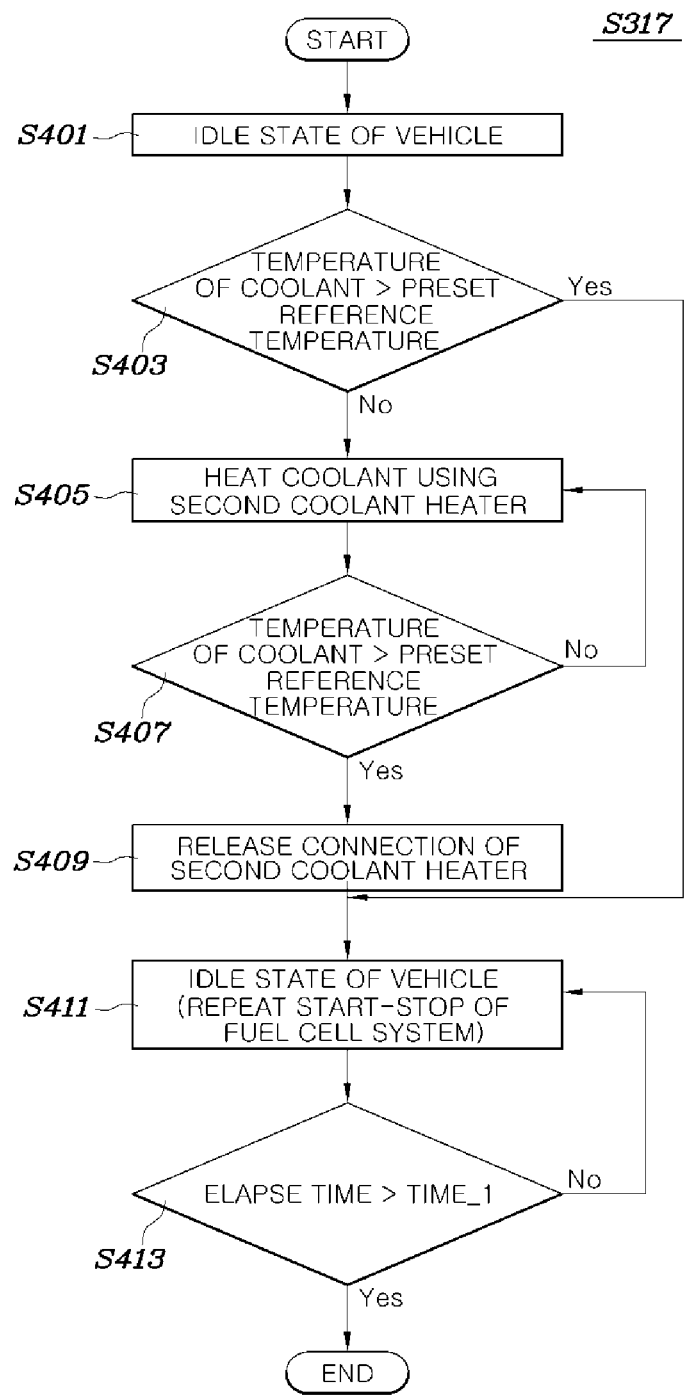
[FIG. 4]

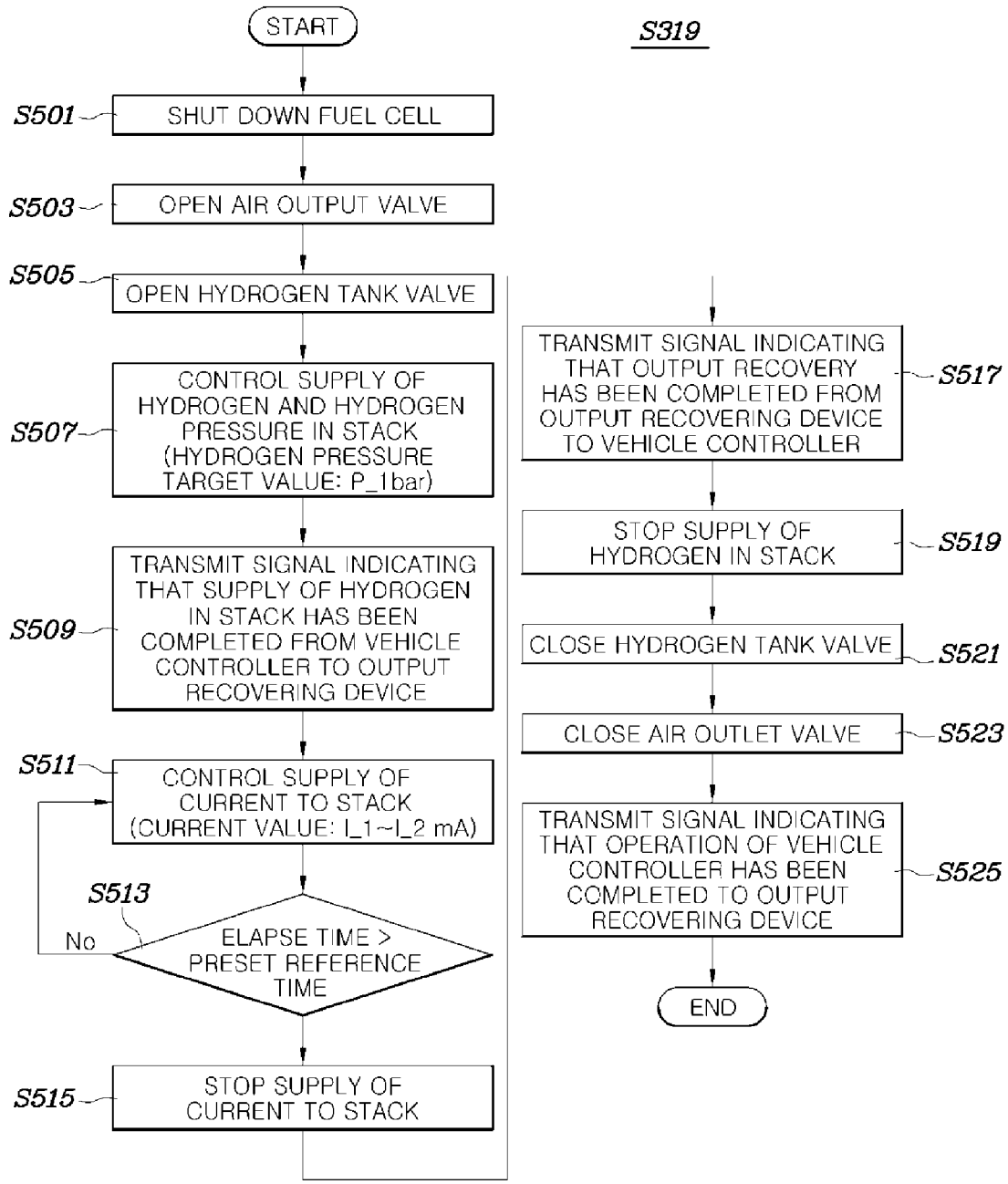

SYSTEM AND METHOD FOR RECOVERING OUTPUT OF FUEL CELL

CROSS REFERENCE TO RELATED APPLICATION

The present application claims priority of Korean Patent Application Number 10-2014-0034031 filed on Mar. 24, 2014, the entire contents of which application are incorporated herein for all purposes by this reference.

BACKGROUND OF THE INVENTION

1. Technical Field

The present invention relates to a system and a method for recovering an output of a fuel cell, and more particularly, to a system and a method for recovering an output of a fuel cell capable of recovering performance of a fuel cell stack.

2. Description of the Related Art

A fuel cell vehicle is a vehicle that is powered by a fuel cell stack in which a plurality of fuel cells are stacked together to provide an appropriate amount in order to power the vehicle. These fuel cell systems typically include a fuel supplying system supplying hydrogen, (i.e., fuel or the like), to the fuel cell stack, an air supplying system supplying oxygen, (i.e., an oxidizing agent required for an electrochemical reaction), a water and heat managing system controlling a temperature of the fuel cell stack, and other components well known in the art.

In particular, the fuel supplying system decreases pressure of compressed hydrogen in a hydrogen tank and supplies the compressed hydrogen of which the pressure is reduced to an anode of the fuel cell stack, and the air supplying system supplies external air sucked in by operating an air blower to a cathode of the fuel cell stack.

When hydrogen is supplied to the anode of the fuel cell stack and oxygen is supplied to the cathode of the fuel cell stack, hydrogen ions are separated through a catalytic reaction in the anode. The separated hydrogen ions are transferred to an oxidizing electrode, which is the cathode, through an electrolyte membrane, and the hydrogen ions separated in the anode generates an electrochemical reaction together with electrons and the oxygen in the oxidizing electrode, thus generating electrical energy may be obtained. In detail, electrochemical oxidation of the hydrogen occurs in the anode, and electrochemical reduction of the oxygen occurs in the cathode. Electricity and heat are generated due to movement of electrons generated through the above-mentioned process, and water vapor or water is generated by a chemical action that the hydrogen and the oxygen are bonded to each other.

In order to release hydrogen and oxygen that do not react thereby resulting in byproducts such as water vapor, water, and the heat generated in an electric energy generating process of the fuel cell stack, a draining device is provided. As such, gases, such as the water vapor, the hydrogen, the oxygen, and the like, are drained to the atmosphere through a draining path.

Components such as an air blower, a hydrogen recirculation blower, a water pump, and the like, for driving the fuel cell are connected to a main bus end to facilitate a start-up of the fuel cell, and various relays for facilitating blocking and connection of power and a diode preventing a reverse current reaching the fuel cell may be connected to the main bus end.

Dry air supplied through the air blower is humidified by a humidifier and is then supplied to the cathode of the fuel cell stack. Exhaust gas from the cathode may be transferred to the humidifier in order to be humidified by an internally generated water component and then be used to humidify the dry air to be supplied to the cathode by the air blower.

In a fuel cell vehicle using the fuel cell as a driving source, and especially those using it as a main power source, the farther the vehicle is driven, the more the performance of the fuel cell stack is deteriorated. In some cases, an output of the fuel cell stack is decreased as a result. In order for the fuel cell vehicle to be stably driven, the output from the fuel cell stack should be maintained to be a certain level or more. However, when the fuel cell stack is deteriorated, the output from the fuel cell stack is decreased. In this case, the fuel cell stack must be removed from the vehicle and repaired.

However, a skilled mechanic, a repairing place, a dedicated tool, and the like, are required in order to remove the fuel cell stack from the fuel cell vehicle, and a significant cost is required to separate the fuel cell stack from the fuel cell vehicle and mount the fuel cell stack back into the fuel cell vehicle.

SUMMARY OF THE INVENTION

An object of the present invention is to provide a system and a method for recovering output from a fuel cell stack by using an output recovering device of a fuel cell stack without having to separate the fuel cell stack from a vehicle.

According to an exemplary embodiment of the present invention, there is provided a system for recovering an output of a fuel cell, including: an output recovering device connected to a fuel cell stack through at least one coolant heater line; and a vehicle controller configured to communicate with the output recovering device and control supply of a coolant, air, and hydrogen to the fuel cell stack. The output recovering device may include a current supplier configured to and connected to supply a current to the fuel cell stack and a controller configured to communicate with the vehicle controller and control the current supplied from the current supplier.

In the exemplary embodiment, the vehicle controller may limit a motor torque of the fuel cell vehicle to 0 when the output recovering device is connected thereto. The vehicle controller may also heat the coolant and stop the supply of the air to the fuel cell stack to increase a humidity of the fuel cell stack to a preset reference humidity when a temperature of the coolant is less than a preset reference temperature. Additionally, the vehicle controller may further supply the hydrogen to an anode of the fuel cell stack to maintain a predetermined hydrogen pressure, when a temperature of the coolant is a reference temperature or more and a humidity of the fuel cell stack is a reference humidity or more. The vehicle controller may also open an air outlet valve to drain hydrogen generated in a cathode of the fuel cell stack.

Furthermore, the current supplier may supply the current to the fuel cell stack once the supply of the hydrogen to the anode has completed, and the controller may allow the current supplier to stop the supply of the current once a preset time elapses.

According to another exemplary embodiment of the present invention, there is provided a method for recovering an output of a fuel cell, including: connecting an output recovering device to a fuel cell stack through at least one coolant heater line; stopping driving of a motor of a fuel cell vehicle once the output recovering device is connected; supplying hydrogen to the fuel cell stack once the driving of the motor is stopped; and supplying a current to the fuel cell stack through the output recovering device when a predetermined hydrogen pressure is maintained by supplying the hydrogen.

The supplying of the hydrogen to the fuel cell stack may include: heating a coolant and stopping supply of air to the fuel cell stack to increase a humidity of the fuel cell stack, when a temperature of the coolant is less than a preset reference temperature; and supplying the hydrogen to an anode of the fuel cell stack when a temperature of the coolant is a reference temperature or more and a humidity of the fuel cell stack is a reference humidity or more.

The method for recovering an output of a fuel cell may further include stopping the supply of the current once the current has been supplied to the fuel cell stack for a preset period of time.

The method for recovering an output of a fuel cell may further include, before supplying of the hydrogen to the fuel cell stack, draining hydrogen generated in a cathode of the fuel cell stack.

According to still another exemplary embodiment of the present invention, there is provided a system for recovering an output of a fuel cell, including: a cooling unit having therein a coolant that adjusts a temperature of a fuel cell stack and a plurality of coolant heaters that heat the coolant; and an output recovering device connected to at least one connector to which the plurality of coolant heaters are connected to supply a current to the fuel cell stack.

BRIEF DESCRIPTION OF THE DRAWINGS

FIG. 3 is a flow chart generally showing a method for recovering an output of a fuel cell according to an exemplary embodiment of the present invention; and FIGS. 4 and 5 are flow charts showing a portion of the method for recovering an output of a fuel cell according to an exemplary embodiment of the present invention in detail.

DESCRIPTION OF THE EXEMPLARY EMBODIMENTS

Figure 1:
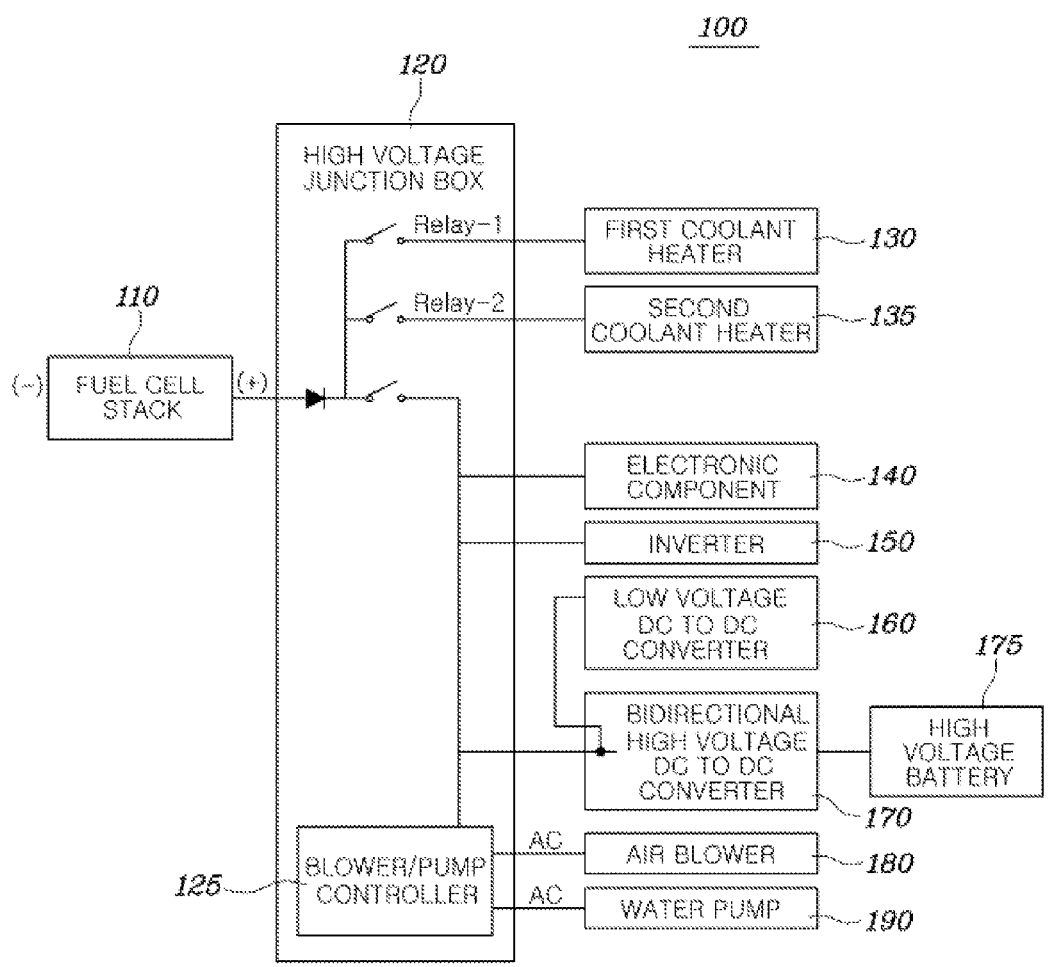
FIG. 1 is a block diagram schematically showing a fuel cell system according to an exemplary embodiment of the present invention.

Specific structural and functional descriptions will be provided only in order to describe various exemplary embodiments of the present invention disclosed in the present specification or disclosure. Therefore, exemplary embodiments of the present invention may be implemented in various forms, and the present invention is not to be interpreted as being limited to exemplary embodiments described in the present specification or disclosure.

Since exemplary embodiments of the present invention may be various modified and may have several forms, specific exemplary embodiments will be shown in the accompanying drawings and will be described in detail in the present specification or disclosure. However, it is to be understood that the present invention is not limited to specific exemplary embodiments, but includes all modifications, equivalents, and substitutions included in the spirit and the scope of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, numerals, operations, components, parts, or a combination thereof, but do not preclude the presence or addition of one or more other features, numerals, steps, operations, components, parts, or a combination thereof.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes fuel cell hybrid vehicles, electric fuel cell vehicles, plug-in hybrid fuel cell electric vehicles, hydrogen-powered vehicles, and other fuel cell vehicles.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. Like reference numerals proposed in each drawing denote like components.

Figure 2:
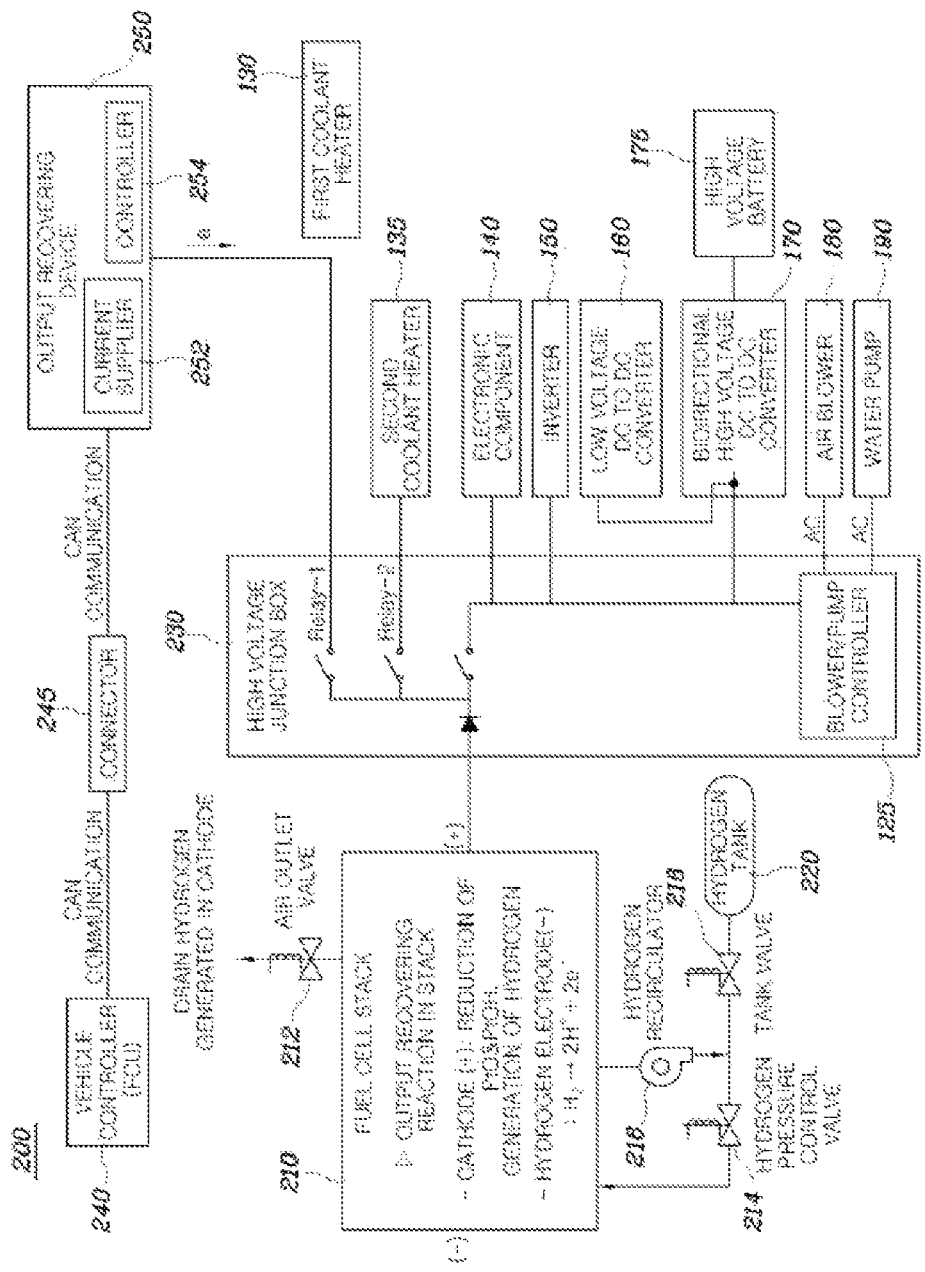
FIG. 2 is a block diagram schematically showing a system for recovering an output of a fuel cell according to an exemplary embodiment of the present invention.

FIG. 1 is a block diagram schematically showing a fuel cell system according to an exemplary embodiment of the present invention; and FIG. 2 is a block diagram schematically showing a system for recovering an output of a fuel cell according to an exemplary embodiment of the present invention. Referring to FIG. 1, the fuel cell system 100 may be configured to include a fuel cell stack 110, a high voltage junction box 120 connected to an output terminal of the fuel cell stack 110, a first coolant heater 130 connected to a first relay, a second coolant heater 135 connected to a second relay, electronic components 140, an inverter 150 configured to convert a direct current (DC) power into an alternating current (AC) power between a motor (not shown) and the high voltage junction box 120, a low voltage DC to DC converter 160 configured to convert a first voltage into a lower second voltage and supplying the lower second voltage to the electronic components 140, a bidirectional high voltage DC to DC converter 170 configured to control and divide power between the fuel cell stack 110 and a high voltage battery 175 (e.g., 120 V or greater), an air blower 180, a water pump 190, and a blower/pump controller 125 configured to control the air blower 180 and the water pump 190.

Referring to FIG. 2, the system 200 for recovering an output of a fuel cell may include an output recovering device 250 connected to a fuel cell stack 210 through a first relay instead of the first coolant heater 130 of the fuel cell system 100. The output recovering device 250 may include a current supplier 252 supplying electrons (e) to the fuel cell stack 210 and a controller 254 connected to a vehicle controller 240 through a connector 245 to communicate with the vehicle controller in a controller area network (CAN) scheme and control the current supplier 252. The output recovering device 250 may be connected to the fuel cell stack 210 through at least one of the coolant heater lines connected to the first coolant heater or the second coolant heater.

The vehicle controller 240 (e.g., a fuel cell Control unit (FCU)) may be connected to the output recovering device 250 through the connector 245 and may control the supply of coolant, air, and hydrogen to the fuel cell stack 210. As such, a method for recovering an output of a fuel cell stack according to an exemplary embodiment of the present invention will be described in detail below.

FIG. 3 is a flow chart generally showing a method for recovering an output of a fuel cell according to an exemplary embodiment of the present invention. Referring to FIG. 3, in order to recover the output of the fuel cell stack, when the fuel cell vehicle is turned off (S301), the first coolant heater 130 connected to the high voltage junction box 230 is removed (S303). That is, in the fuel cell vehicle, the first coolant heater 130 is connected to the high voltage junction box 230, and the first relay is positioned between the first coolant heater 130 and the high voltage junction box 230. As such, so the output recovering device can be connected into the system, a first coolant heater connector, for example, may be disconnected from the first coolant heater 130 and is then connected to the output recovering device 250 (S305). At this point, the output recovering device 250 is connected to both the fuel cell vehicle and the vehicle controller 240 through the connector 245. The output recovering device 250, the connector 245, and the vehicle controller 240 may then communicate with each other in the CAN communication scheme.

Once the connection of the output recovering device 250 is completed, the output recovering device 250 is initiated (S309), and the controller 254 of the output recovering device 250 transmits a signal indicating that the connection of the output recovering device 250 is completed and has been initiated to the vehicle controller 240. Once the vehicle controller 240 determines that the initiation and connection of output recovering device 250 to the fuel cell vehicle has been completed (S311), the vehicle controller again starts up the fuel cell vehicle (S313). However, contrary to normal operation, the vehicle controller limits the torque of a driving motor to 0 (S315).

Next, the vehicle controller 240 raises a temperature of a coolant circulated in the fuel cell stack 210 and increases a humidity in the fuel cell stack 210 (S317). This is to environmentally prepare the fuel cell stack for recovery and control the output of the fuel cell stack. More specifically, in order to promote a chemical reaction for recovering the output of the fuel cell stack 210, the vehicle controller 240 may raise the temperature of the coolant of the fuel cell vehicle to a preset reference temperature and may increase the humidity of the fuel cell stack 210 to a preset reference humidity in order to supply the proper amount of moisture required for the chemical reaction (S317).

Then, when the temperature of the coolant is the reference temperature or more and the humidity of the fuel cell stack 210 is the reference humidity or more, the vehicle controller 240 begins recovery of the output performance of the fuel cell stack 210 (S319). In detail, the vehicle controller 240 may supply hydrogen to an anode side of the fuel cell stack 210. A predetermined hydrogen pressure is maintained due to the supplied hydrogen. Then, electrons are supplied from the output recovering device 250 to the fuel cell stack 210, such that an output recovering chemical reaction occurs in the fuel cell stack 210. As such, the following chemical reaction occurs in a cathode of the fuel cell stack 210.

$$PtO+H++e- \rightarrow PtOH+H_2O \qquad \text{[Chemical Formula 1]}$$

$$PtOH+H++e- \rightarrow Pt+H_2O \qquad \text{[Chemical Formula 2]}$$

$$2H++2e- \rightarrow H_2 \qquad \text{[Chemical Formula 3]}$$

Where H is hydrogen, O is oxygen and Pt is platinum.

If oxidized catalysts PtO (platinum oxide) and PtOH (platinum hydroxide) are changed into Pt through these reactions, when electricity is generated in the fuel cell stack 210, an internal resistance decreases, thereby increasing the output of the fuel cell stack 210. That is, an oxide film on a surface of a platinum catalyst in the cathode of the deteriorated fuel cell stack 210 is removed due to a chemical reaction on the surface of the platinum catalyst being promoted.

Once the output of the fuel cell stack 210 is recovered by the above-mentioned chemical reaction, an operation completion lamp (not shown) of the output recovering device 250 is turned on (S321), and the vehicle controller 240 turns off the fuel cell vehicle (S323). Then, a switch within the output recovering device 250 is turned off (S325), the connection between the first coolant heater connector and the output recovering device 250 is released, and a system state returns to an original system state (S327). That is, the first coolant heater 130 is again reconnected to the first coolant heater connector. In addition, the connection between the output recovering device 250 and the vehicle connector 245 is also released.

FIGS. 4 and 5 are flow charts showing a portion of the method for recovering an output of a fuel cell according to an exemplary embodiment of the present invention in detail. In detail, FIG. 4 is a flow chart showing an algorithm included in Step S317 among steps shown in FIG. 3 in detail, and FIG. 5 is a flow chart showing an algorithm included in Step S319 among steps shown in FIG. 3 in detail.

Referring to FIGS. 2 and 4, the vehicle controller 240 determines whether or not the temperature of the coolant is higher than a preset reference temperature (S403) in an idle state of the fuel cell vehicle (S401). When the temperature of the coolant is currently higher than the preset reference temperature, the vehicle controller 240 repeats a start-stop of the fuel cell stack for a preset time (time_1) or more (S411 and S413).

On the other hand, when the temperature of the coolant is currently lower than the preset reference temperature, the vehicle controller 240 repeatedly heats the coolant using the second coolant heater 135 until the temperature of the coolant becomes higher than the preset reference temperature (S405). When the temperature of the coolant becomes higher than the preset reference temperature by heating the coolant, the vehicle controller 240 releases the connection of the second coolant heater 135 using the second relay (S409).

After the coolant is heated, and the temperature of the coolant is higher than the preset reference temperature, the vehicle controller 240 may then maintain the fuel cell vehicle in an idle state in order to increase the humidity in the fuel cell stack, thereby starting-stopping the fuel cell system. When the fuel cell stack is stopped, the blower/motor controller 125 stops an operation of the air blower 180, and the high voltage battery 175 supplies an output required for the idle state of the fuel cell vehicle. Since the operation of the air blower 180 is stopped, the humidity of the fuel cell stack 210 is increased, and water vapor in the fuel cell stack 210 is condensed, such that moisture moves to an electrode of the fuel cell stack 210.

Referring to FIGS. 2, 3, and 5, when the temperature of the coolant of the fuel cell stack 210 is the preset reference temperature or more and the humidity of the fuel cell stack 210 is the preset reference humidity or more, the vehicle controller 240 may shut down the fuel cell (S501). Then, the vehicle controller 240 opens an air outlet valve 212 (S503) to drain hydrogen generated in the cathode to the outside. In addition, the vehicle controller 240 opens a hydrogen tank valve 218 connected to a hydrogen tank 220 (S505) to supply hydrogen to the anode side of the fuel cell stack 210. Here, a pressure value of the supplied hydrogen is maintained as a constant preset value. In detail, the vehicle controller 240 may constantly maintain the pressure of the hydrogen at the anode side of the fuel cell stack 210 using a hydrogen pressure control valve 214. The reason for this is that the pressure value of the hydrogen should be maintained as a certain constant value in order to promote the chemical reaction for recovering the output described above.

Then, the vehicle controller 240 may transmit a signal indicating that the supply of the hydrogen to the fuel cell stack 210 has been completed to the controller 254 of the output recovering device 250 (S509). The controller 254 of the output recovering device 250 controls the current supplier 252 to supply a current to the fuel cell stack 210 (S511). When the current is supplied, a chemical reaction occurs at the cathode side of the fuel cell stack 210, such that the output of the fuel cell stack 210 may be recovered. Once the current is supplied from the current supplier 252 for a preset reference time or more (S513), the controller 254 stops the supply of the current to the fuel cell stack 210 (S515). After the supply of the current is stopped, the controller 254 transmits an output recovering completion signal to the vehicle controller 240 (S517).

Then, the vehicle controller 240 stops the supply of the hydrogen to the fuel cell stack 210 (S519), and closes the hydrogen tank valve 218 and the air outlet valve 212 (S521 and S523). In addition, the vehicle controller 240 may transmit a signal indicating that an operation thereof has been completed to the output recovering device 250. When the signal indicating that the operation of the vehicle controller 240 has been completed is received, the operation completion lamp of the output recovering device 250 may be turned on (S321).

With the system and the method for recovering an output of a fuel cell stack according to exemplary embodiments of the present invention, when performance of the output of the fuel cell stack is deteriorated, the performance may be easily recovered, and durability of the fuel cell stack may be increased without removing the fuel cell stack from the vehicle and at a relatively low cost.

Although the present invention has been described with reference to exemplary embodiments shown in the accompanying drawings, it is only an example. It will be understood by those skilled in the art that various modifications and equivalent other exemplary embodiments are possible from the present invention. Accordingly, an actual technical protection scope of the present invention is to be defined by the following claims.

What is claimed is:

1. A system for recovering an output of a fuel cell, comprising:
    an output recovering device configured to be connected to a fuel cell stack through at least one line; and
    a vehicle controller programmed to communicate with the output recovering device and control supply of a coolant, air, and hydrogen to the fuel cell stack,
    wherein the output recovering device includes:
        a current supplier connected and configured to supply a current to the fuel cell stack, and
        a controller programmed to communicate with the vehicle controller and to control the current supplied by the current supplier, and
    wherein the vehicle controller is programmed either to heat the coolant and stop the supply of the air to the fuel cell stack to increase a humidity of the fuel cell stack to a preset reference humidity, when a temperature of the coolant is less than a preset reference temperature or to supply the hydrogen to the anode of the fuel cell stack to maintain a predetermined hydrogen pressure, when a temperature of the coolant is a reference temperature or more and humidity of the fuel cell stack is a reference humidity or more.

2. The system for recovering an output of a fuel cell of claim 1, wherein the vehicle controller is further programmed to limit a motor torque of the fuel cell vehicle to 0 once the output recovering device is connected thereto.

3. The system for recovering an output of a fuel cell of claim 1, wherein the vehicle controller is programmed to open an air outlet valve to drain hydrogen generated in a cathode of the fuel cell stack.

4. The system for recovering an output of a fuel cell of claim 1, wherein the current supplier is configured to supply the current to the fuel cell stack once the supply of the hydrogen to the anode is completed.

5. The system for recovering an output of a fuel cell of claim 4, wherein the controller is programmed to stop the supply of the current once a preset time period has elapsed.

6. The system for recovering an output of a fuel cell of claim 1, wherein the vehicle controller and the fuel cell stack are installed in a fuel cell vehicle, the vehicle controller is further programmed to limit a motor torque of the fuel cell vehicle to 0 once the output recovering device is connected thereto.

7. The system for recovering an output of a fuel cell of claim 6, wherein the vehicle controller is programmed to heat the coolant and stop the supply of the air to the fuel cell stack to increase a humidity of the fuel cell stack to a preset reference humidity, when a temperature of the coolant is less than a preset reference temperature.

8. The system for recovering an output of a fuel cell of claim 6, wherein the vehicle controller is programmed to supply the hydrogen to an anode of the fuel cell stack to maintain a predetermined hydrogen pressure, when a temperature of the coolant is a reference temperature or more and a humidity of the fuel cell stack is a reference humidity or more.

9. The system for recovering an output of a fuel cell of claim 6, wherein the vehicle controller is programmed to open an air outlet valve to drain hydrogen generated in a cathode of the fuel cell stack.

10. The system for recovering an output of a fuel cell of claim 9, wherein the current supplier is configured to supply the current to the fuel cell stack once the supply of the hydrogen to the anode is completed.

11. The system for recovering an output of a fuel cell of claim 10, wherein the controller is programmed to stop the supply of the current once a preset time period has elapsed.

* * * * *